(12) United States Patent
Mang et al.

(10) Patent No.: US 6,507,348 B1
(45) Date of Patent: Jan. 14, 2003

(54) METHOD AND APPARATUS FOR CLIPPING AN OBJECT ELEMENT IN ACCORDANCE WITH A CLIP VOLUME

(75) Inventors: Michael A. Mang, Oviedo, FL (US); Ralph C. Taylor, Deland, FL (US); Michael J. Manter, Orlando, FL (US); Thomas B. Pringle, Winter Park, FL (US)

(73) Assignee: ATI International, SRL, Christ Church (BB)

( * ) Notice: Subject to any disclaimer, the term of this patent is extended or adjusted under 35 U.S.C. 154(b) by 0 days.

(21) Appl. No.: 09/496,732

(22) Filed: Feb. 2, 2000

(51) Int. Cl.[7] ................................................. G06T 15/30
(52) U.S. Cl. ....................................................... 345/622
(58) Field of Search ................................. 345/620, 622, 345/623, 627, 629

(56) References Cited

U.S. PATENT DOCUMENTS 3,816,726 A  6/1974  Sutherland et al.
5,361,386 A  11/1994  Watkins et al.

OTHER PUBLICATIONS

Baldwin, Aug. 13, 1998, US Patent Application Publication 2002/0030693A1.*
Open GL—Programming Guide Ver 1.2 p. 38–41.
Barycentric Coordinates May 22, 1999.
Barycentric Coordinate—Geometric Problem May 22, 1999.
Van Obel Theorem & Barycentric Coordinates May 22, 1999.

* cited by examiner

*Primary Examiner*—Jeffery Brier
*Assistant Examiner*—G. F. Cunningham
(74) *Attorney, Agent, or Firm*—Vedder, Price, Kaufman and Kammholz

(57) ABSTRACT

A method and apparatus for clipping an object element include processing that begins by ascribing barycentric coordinates to each original vertices of an object-element wherein each barycentric coordinate is a weighting factor with respect to a corresponding original vertex. The processing continues by obtaining clipping distances for each original vertex with respect to a clipping plane. For a new vertex of an object-element that represents an intersection of an edge of the object-element with the clipping plane, the process continues by determining a barycentric coordinate for the new vertex. The determination of the new vertex is based on the barycentric coordinates of the original vertices defining the edge and the clipping distances. Having determined the barycentric coordinates for the new vertices corresponding to a clipping plane, the process is repeated for each of a plurality of other clipping planes that intersect the object-element. Once all of the clipping planes have been processed, the attributes for the resulting clipped object element are calculated based on the barycentric coordinates of the vertices defining the clipped object element and the attributes of the original vertices.

28 Claims, 11 Drawing Sheets

METHOD AND APPARATUS FOR CLIPPING AN OBJECT ELEMENT IN ACCORDANCE WITH A CLIP VOLUME

TECHNICAL FIELD OF THE INVENTION

This invention relates generally to computers and more particularly to video graphics processing involving the generation of geometric primitives.

BACKGROUND OF THE INVENTION

FIG. 1 illustrates a schematic block diagram of a computing system 10 that includes a central processing unit 12, a chipset 14, system memory 16, a video graphics circuit 18, and a display 20. The video graphics circuit 18 includes a raster engine 22 and a frame buffer 24. The system memory 16, for processing video graphics data, includes geometry software 26 and texture maps 28. The display 20 may be a CRT display, LCD display, or other type of computer display.

To process video graphic data, the central processing unit 12 executes the geometry software 26 to produce geometric primitives. The geometric primitives include attributes for each vertex of a triangle, where a plurality of triangles constitutes an object to be displayed. The attributes of the geometric primitives include spatial coordinates, texture coordinates, color data, and specular color data. Upon receiving the geometric primitives, the raster engine generates pixel data from the geometric primitives for each vertex and stores the pixel data in frame buffer 24. In essence, the raster engine 22 generates pixel data for each pixel within a given triangle based on the geometric primitives of the vertices of the triangle. Once the raster engine has generated pixel data for an entire frame, or field, the raster engine retrieves the pixel data from the frame buffer 24 and provides it to display 20 for display. During the generation of pixel data, if the geometric primitives include a texture coordinate, the raster engine 22 retrieves texture information from texture maps 28.

The geometry software 26 uses a Sutherland-Hodgeman Polygon Clipping Algorithm to produce the geometric primitives. In general, the Sutherland-Hodgeman Polygon Clipping Algorithm compares the vertices of each triangle of an object with a plane of a clip volume or one of a plurality of user defined planes. FIG. 2 illustrates a clip volume, which includes six planes. As shown, the planes include a near plane 32 (which corresponds to an eye plane), a far plane 34 (which corresponds to the screen), a top plane 36, a bottom plane 38, a left-side plane 40, and a right side plane 42.

If the plane does not clip (i.e., intersect the triangle), another plane is compared. The Sutherland-Hodgeman Polygon Clipping Algorithm compares each plane with the triangle to determine whether a plane clips the triangle. If none of the planes clip the triangle, the geometric primitives of the triangle corresponding to the three original vertices are provided to the raster engine. If, however, at least one plane intersects the triangle, the Sutherland-Hodgeman Polygon Clipping Algorithm determines a clipping distance from each vertices with respect to the clipping plane (e.g., the clipping distances may correspond to d1, d2, and d3). If a vertex is within the clip volume, the clipping distance will be positive, if a vertex is outside the clip volume, the clipping distance would be negative. A positive clipping distance has a "zero" clip code and a negative clipping distance has a "1" clip code.

Having obtained the clip codes and clipping distances, the Sutherland-Hodgeman Polygon Clipping Algorithm determines the new vertices for the clipped triangle. To begin the Sutherland-Hodgeman Polygon Clipping Algorithm utilizes a clip code table to determine an operation to be performed. The clip code table includes binary codes for previous and current vertices and the corresponding operation. The following is an example of the clip code table.

| previous vertex clip code | current vertex clip code | corresponding operation |
| --- | --- | --- |
| 0 | 0 | add current vertex to clipped triangle vertices list |
| 0 | 1 | calculate new vertex and add it to the list, remove current vertex from the list |
| 1 | 0 | calculate new vertex and add it to the list, and maintain the current vertex in the list |
| 1 | 1 | remove the current vertex from the list |

For a given triangle, V1, V2, and V3 represent the three original vertices. For a first clip code table look-up, V3 is the previous vertex and V1 is the current vertex. For a second look up, V1 is the previous vertex and V2 is the current vertex. For a third look up, V2 is the previous vertex and V3 is the current vertex. For example, if V1 and V2 have a "zero" clip code, and V3 has a "one" clip code the three table look ups have a binary code of (1,0), (0,0), and (0,1). Thus, the operation for V3 to V1 will be to add the current vertex (e.g., V1) and calculate and add a new vertex (e.g., C0). The operation for V1 to V2 will be to add the current vertex (e.g., V2). The operation for V2 to V3 will be to calculate and add a new vertex (e.g., C1).

To calculate the spatial coordinates of the new vertices (e.g., C0 and C1), the Sutherland-Hodgeman Polygon Clipping Algorithm utilizes the homogenous vertex spatial coordinates (e.g., X, Y, Z, W) and the clipping distances. Such a calculation is process intensive. In addition to calculating the coordinates, the Sutherland-Hodgeman Polygon Clipping Algorithm determines the attributes (e.g., RGB color components, texture coordinates, etc.) for each of the new vertices.

As these values are calculated, they are stored in memory. Having stored these values, the Sutherland-Hodgeman Polygon Clipping Algorithm performs the same process for the next plane that clips the triangle and continues until all clipping planes have been processed. As one can imagine, the Sutherland-Hodgeman Polygon Clipping Algorithm requires a substantial amount of memory to store the attributes for all the vertices of a clipped triangle. For example, if each attribute is a 32 bit word, each vertex has 32 attributes, and there are 12 clipping planes, the memory requirement would be (12 plus 3)×32×32, which equals 2 K bytes of memory. Note that the 12 plus 3 corresponds to 12 clipping planes plus the three for the original vertices. Since a triangle is rarely clipped by more than a few planes, most of this memory is not used.

Once the attributes for the final vertices have been obtained, the geometry software 26 then performs lighting and/or texture processing for the clipped triangle. As is known, the lighting function determines the particular lighting effect that is to be rendered. The lighting effect may be from a single light source or a plurality of light sources wherein the light sources is either close to the object or at a diffused distance. The texture coordinate processing includes texture transformation or texture generation. Since the lighting and/or texture mapping functions are dependent on the finalized vertices of the clipped triangle, these processes must be performed after the clipping process. As such, they are done in a serial manner.

Therefore, a need exists for a method and apparatus that provides for parallel processing of geometric primitives and reduces memory requirements such that a hardware geometry engine may be practically implemented.

DETAILED DESCRIPTION OF A PREFERRED EMBODIMENT

Generally, the present invention provides a method and apparatus for clipping an object element in accordance with a clipped volume. Such a method and apparatus include processing that begins by ascribing barycentric coordinates to each original vertices of an object-element wherein each barycentric coordinate is a weighting factor with respect to a corresponding original vertex. The processing continues by obtaining clipping distances for each original vertex with respect to a clipping plane. For a new vertex of an object-element that represents an intersection of an edge of the object-element with the clipping plane, the process continues by determining a barycentric coordinate for the new vertex. The determination of the new vertex is based on the barycentric coordinates of the original vertices defining the edge and the clipping distances. Having determined the barycentric coordinates for the new vertices corresponding to a clipping plane, the process is repeated for each of a plurality of other clipping planes that intersect the object-element. Once all of the clipping planes have been processed, the attributes for the resulting clipped object element are calculated based on the barycentric coordinates of the vertices defining the clipped object element and the attributes of the original vertices. With such a method and apparatus, barycentric coordinates are determined for each new vertex of a clipped object-element. By determining the barycentric coordinates, other attributes of the object-element are not determined until the final clipped object-element is obtained. This processing saves considerable memory requirements for a geometric engine, thereby allowing the geometric engine to be readily implemented in hardware.

Figure 1:
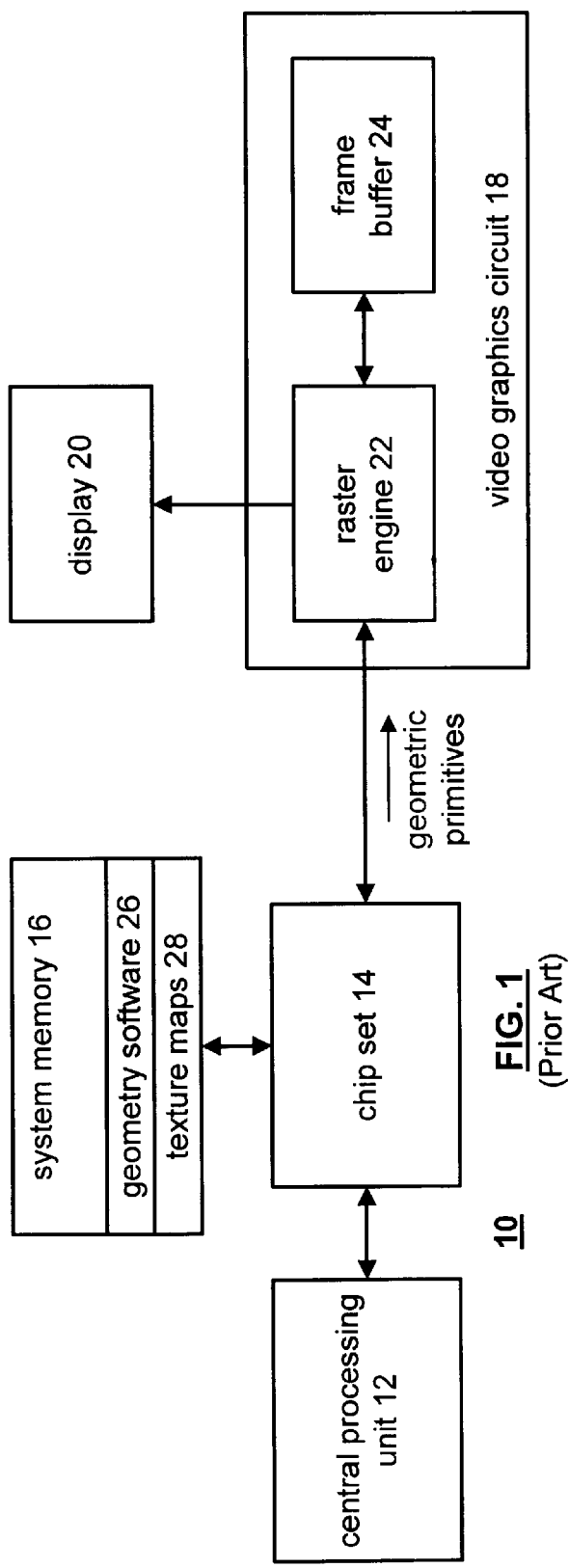
FIG. 1 illustrates a schematic block diagram of a prior art computing system.
Figure 2:
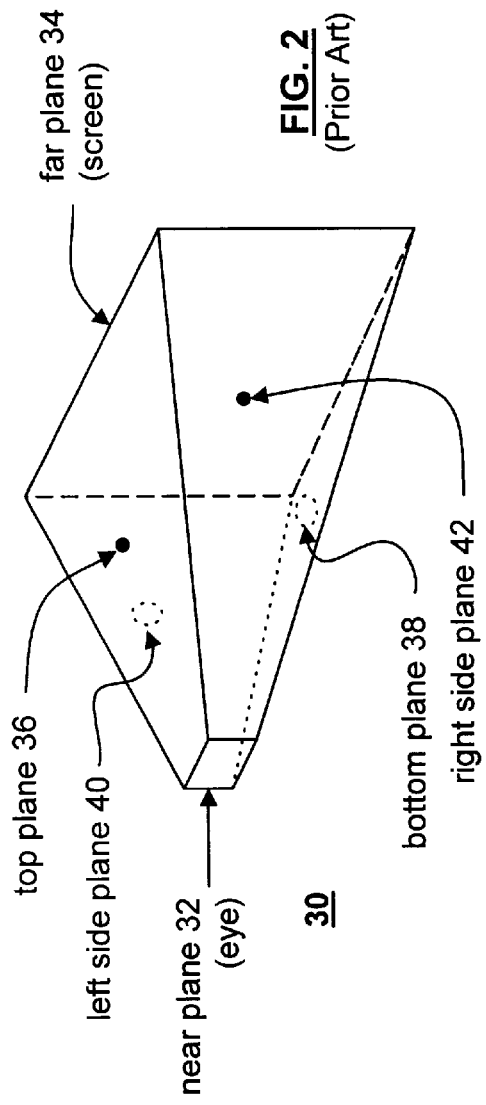
FIG. 2 illustrates a graphical representation of a clip volume.
Figure 3:
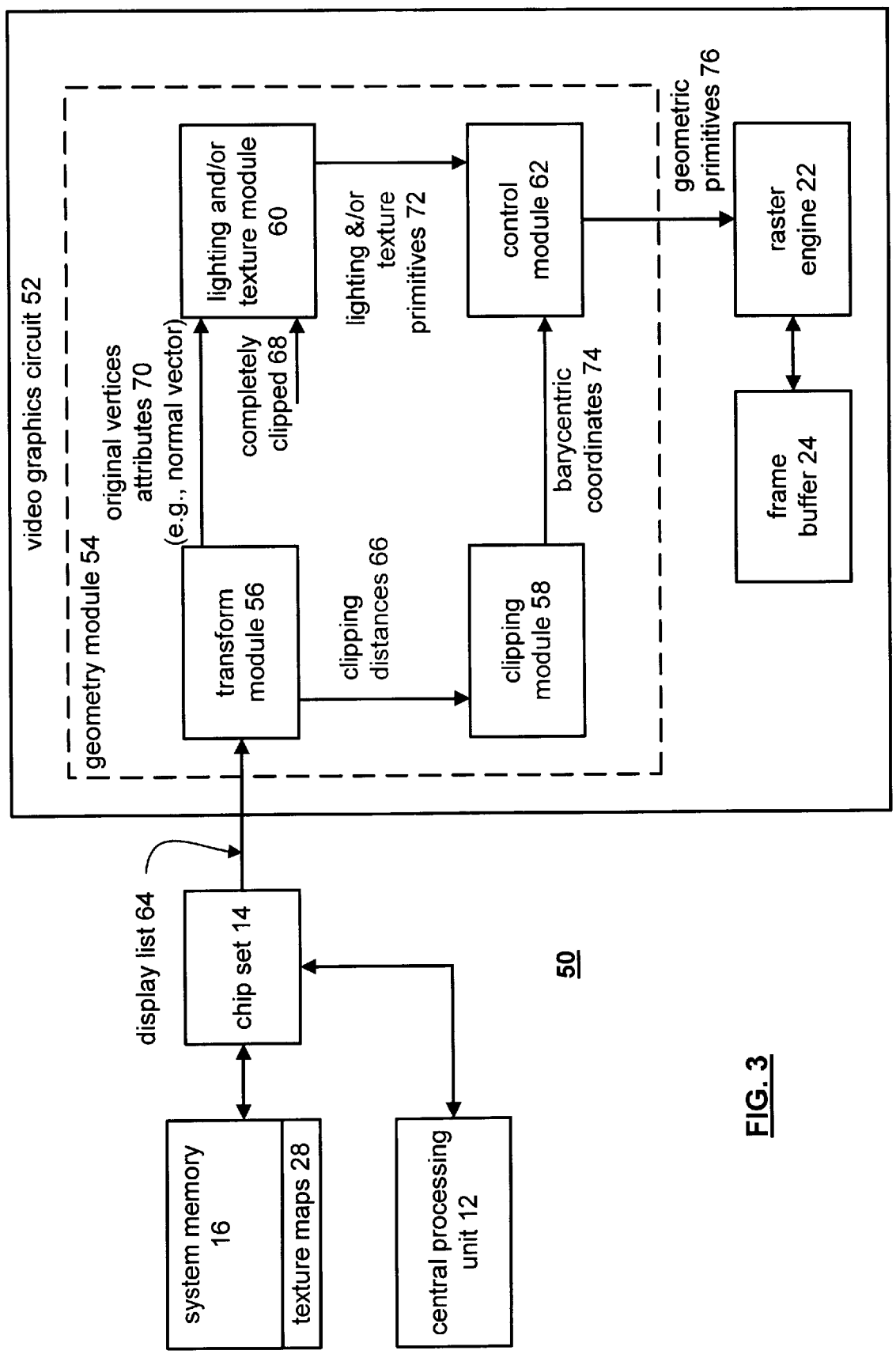
FIG. 3 illustrates a schematic block diagram of a computing system in accordance with the present invention.

The present invention can be more fully described with reference to FIGS. 3 to 12. FIG. 3 illustrates a schematic block diagram of a computing system 50 that includes a central processing unit 12, a chipset 14, system memory 16, and a video graphics circuit 52. The system memory 16 includes a memory location for storing texture maps 28. The central processing unit 12 generates a display list 64 that is provided to video graphics circuit 52. The display list 64 maybe generated in accordance with the Open GL specification. In essence, the display list 64 includes a list of commands that provide instructions for the video graphics circuit 52 to render a drawing. Alternatively, or in addition to providing the display list 64, the central processing unit 12 may utilize an immediate mode graphics process wherein each time the central processing unit 12 issues a draw command, the video graphics circuit 52 renders the corresponding drawing. Such an immediate mode graphics process is in accordance with the Open GL specification.

The video graphics circuit 52 includes a geometry module 54, the raster engine 22 and the frame buffer 24. The geometry module 52 includes a transform module 56, a clipping module 58, a lighting and/or texture module 60 and a control module 62. Note that the geometry module 54 may be implemented in hardware as a processing module and memory or a plurality of processing modules and a plurality of corresponding memories. Such a processing module may be a microcomputer, microcontroller, microprocessor, digital signal processor, logic circuit, state machine, and/or any device that manipulates signals (analog and/or digital) based on operational instructions. The memory may be a single memory device or a plurality of memory devices. Such a memory device may be a read-only memory, random access memory, electronic memory, floppy disk memory, and/or any device that stores operational instructions. Note that when the processing module implements one or more of its functions via a logic circuit or state machine, the memory storing the corresponding operational instructions is embedded within the circuitry comprising the state machine and/or logic circuit.

The transform module 56 is operably coupled to receive the display list 64 and to produce clipping distances 66 and original vertices' attributes 70, for example: a normal vector of the object element. The transform module 56 generates, for each object-element (e.g., triangle or other polygon that is used to represent a fundamental element of an object) determines whether the object-element is clipped by one of a plurality of clipping planes. The plurality of clipping planes includes the six planes of a clip volume and six planes of user defined clipping planes. For each plane that clips the object, the transform module 56 generates the clipping distances 66. Such a calculation is in accordance with the Evans & Southerland clipper.

The transform module 56 provides the attributes 70 of the original vertices to the lighting and/or texture module 60 and may also provide the attributes 70 to the clipping module 58, but it is not required. Note that the attributes of the original vertices include color data, up to three texture coordinates, spatial coordinates, specular color data, normalized vector data and may further include a second spatial coordinate and a second normalized vector. Accordingly, the lighting and/or texture module 60 will only utilize the corresponding portions of the attributes that are relevant to the lighting and/or texture function. As such, the transform module 56 may provide all of the attributes to the lighting and/or texture module 60 wherein the module 60 only utilizes the appropriate portions of the attributes. Conversely, the transform module 56 may only provide the relevant portions of the attributes 70 to module 60.

The clipping module 58 receives the clipping distances 66 of the original vertices. The clipping module 58, which will be discussed in greater detail with respect to FIGS. 4 through 6. Generally, the clipping module 58 uses the clipping distances to generate barycentric coordinates 74. The processing, which the clipping module 58 utilizes to generate the barycentric coordinate 74, will be discussed in greater detail with reference to FIGS. 8 through 10.

The lighting and/or texture module 60 upon receiving the attributes 70 and upon receiving an indication that the object-element is not completely clipped 68, the module 60 generates lighting and/or texture primitives 72. Note that if the object element is completely clipped, the indicator 68 is set accordingly such that module 60 will not generate the primitives 72. If, however, the object-element is not completely clipped, the lighting and/or texture module 60 will generate lighting and/or texture primitives utilizing the original vertices and attributes of the object-element.

The control module 62 receives the barycentric coordinates 74 and the lighting and/or texture primitives 72. From these inputs, the control module 62 generates geometric primitives 76. The control module 62 then provides the geometric primitive 76 to the raster engine 22, which generates pixel data therefrom.

Figure 4:
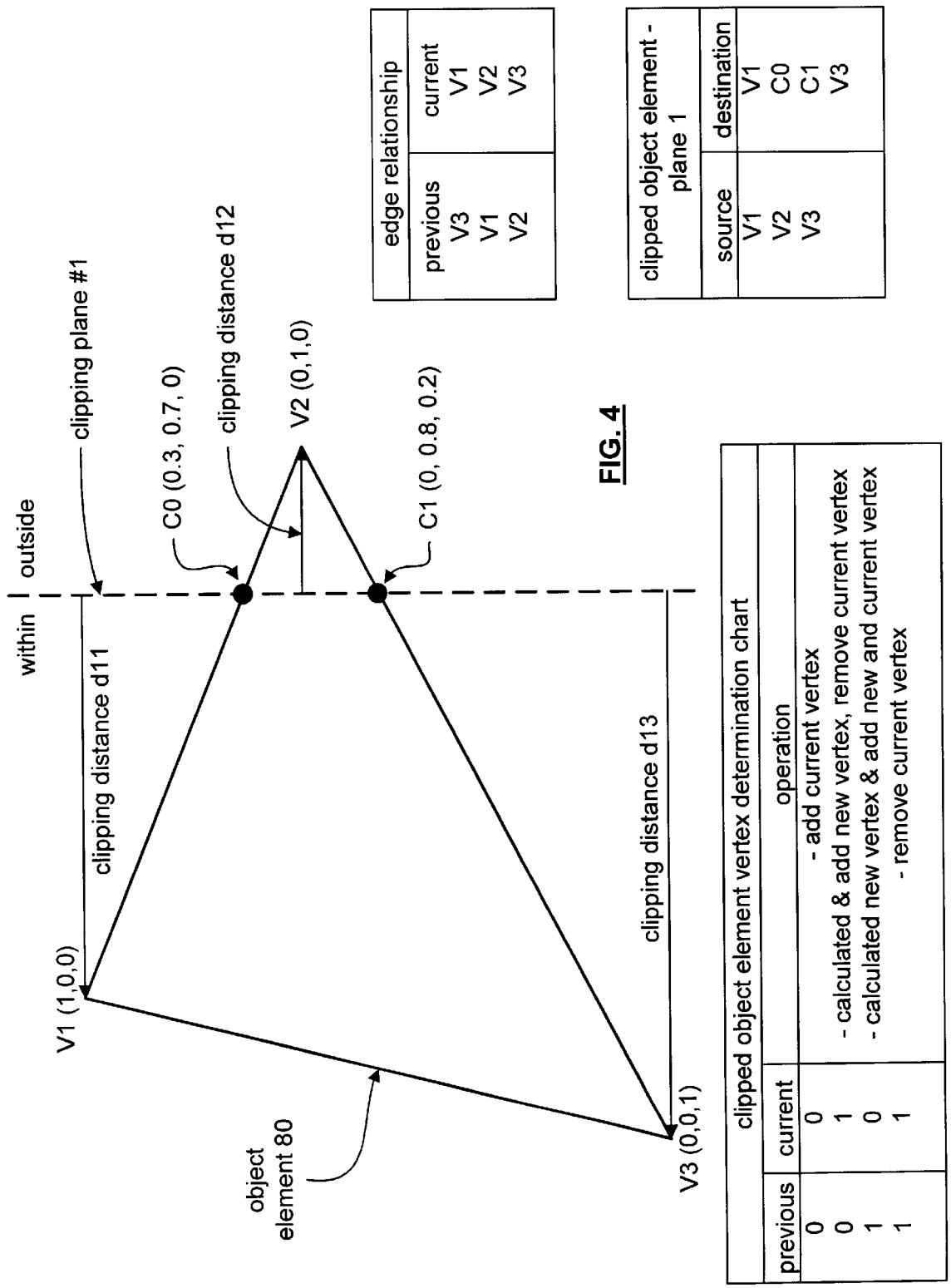
FIGS. 4 through 6 illustrate a graphical representation of clipping an object element in accordance with the present invention.

FIGS. 4 through 7 illustrate the processing of clipping an object-element with respect to multiple clipping planes in accordance with the present invention. FIG. 4 illustrates an object-element 80 that is being clipped by a first clipping plane. The object-element 80 includes three vertices (V1, V2 and V3). As shown, V1 and V3 are within the clipping volume while V2 is outside of the clipping plane. Each of the vertices is ascribed a barycentric coordinate. The barycentric coordinates are ascribed to provide a weighting factor for each of the vertices. In general, the barycentric coordinates include an A component, a B component, and a C component. When at a vertex, the corresponding component is one and zero for the other two components. When at a point that is not at an original vertex, the sum of A, B, and C components for each barycentric coordinate will equal one. As shown, the barycentric coordinates ascribed to V1 is (1, 0, 0), for V2 is (0,1,0), and for V3 is (0,0,1).

The transform module 56 generates the clipping distance for each vertices with respect to clipping plane number 1. As shown, the clipping distance for V1 is represented as $d_{11}$ where the "11" refers to the first vertex being clipped by the first clipping plane. The clipping distance for vertex 2 is represented as $d_{12}$, wherein the "12" refers to the second vertex being clipped by the first clipping plane and the clipping distance for the third vertex is represented as $d_{13}$, wherein the "13" refers to the third vertex being clipped by the first clipping plane. Utilizing the clipping distances, the information contained in the clipped object-element vertex determination chart, and the edge relationship chart, the clipped object-element for plane 1 is derived.

As shown, the clipped object-element vertex determination chart is in accordance with the Sutherland-Hodgeman Polygon Clipping Algorithm wherein the binary combination of the previous and current clip codes determine which operation is to be performed. The edge relationship indicates the relationship between a previous vertex and a current vertex. In this example, the previous vertex has been selected to be V3 with the current vertex being V1, the previous V1 with the current vertex being V2, and the previous vertex being V2 with the current vertex being V3. As one of average skill in the art will appreciate, the ordering of the previous and current vertices may vary from the example provided. Utilizing these values, and recognizing that V1 and V3 have a "zero" clip code while V2 has as "one" clip code, the clipped object-element for plane 1 is obtained. As shown in the clipped object-element for plane 1 table, the source corresponds to the current vertex and the destination corresponds to the vertex, or vertices, that result from the operation performed in accordance with the clip codes. Thus, when V1 is the source, V1 corresponds to the current vertex in the edge relationship table and V3 corresponds to the previous vertex in the edge relationship table. In the example provided, both V1 and V3 have a clip code of zero. Thus, the only operation to be performed is to add the current vertex to the clipped object-element for plane 1 table. As shown, the current vertex of V1 has been added in the destination column.

The next source is V2. As such, the previous vertex is V1 and the current vertex is V2. For this example, V1 has a clip code of 0 and V2 has a clip code of 1. According to the determination chart, the operation to be performed removes the current vertex and calculates a new vertex, which is added to the destination list. In this example, traversing the edge of object-element 80 from V1 to V2, the new vertex C0 is obtained. For C0, the barycentric coordinates are derived. The derivation of the barycentric coordinates will be described in greater detail with reference to FIG. 8.

For source V3, the previous vertex is V2 and the current vertex is V3. For this example, V2 has a clip code of 1 and V3 has a clip code of 0. Thus, the binary code is 10 for the vertex determination chart, which indicates that the operation to be performed is to calculate a new vertex and add the new vertex and the current vertex to the destination. Accordingly, the new vertex C1 is obtained along the edge of object-element 80 between vertex V2 and V3. In addition, the current vertex of V3 is added to the destination chart. Having completed this step, the new vertices for object-element 80 are derived. Note that the barycentric coordinates for C1 are calculated at this time. In essence, the calculation of the barycentric coordinates is a weighting factor between the relative position of the new vertex with relation to the original vertices. As shown, C0 has as barycentric coordinate of (0.3, 0.7, 0). As shown, the intersection of clipping plane 1 with the edge of V1 to V2 occurs closer to V2 than to V1. Thus, the barycentric coordinate for C0 has a larger B component (i.e., the component associated with V2) than an A component (i.e., the component associated with V1). The C component is zero, since C0 is on the edge of the object element defined by V1 and V2. Similarly, the barycentric coordinate components for C1 correspond to relative closeness of the intersection with the vertices V2 and V3. As shown, the A component for the barycentric coordinate of C1 is 0, the B component is 0.8, and the C component is 0.2. Again, the details of the derivation of the barycentric coordinates for C1 and C0 will be described in greater detail with reference to FIG. 8.

Figure 5:
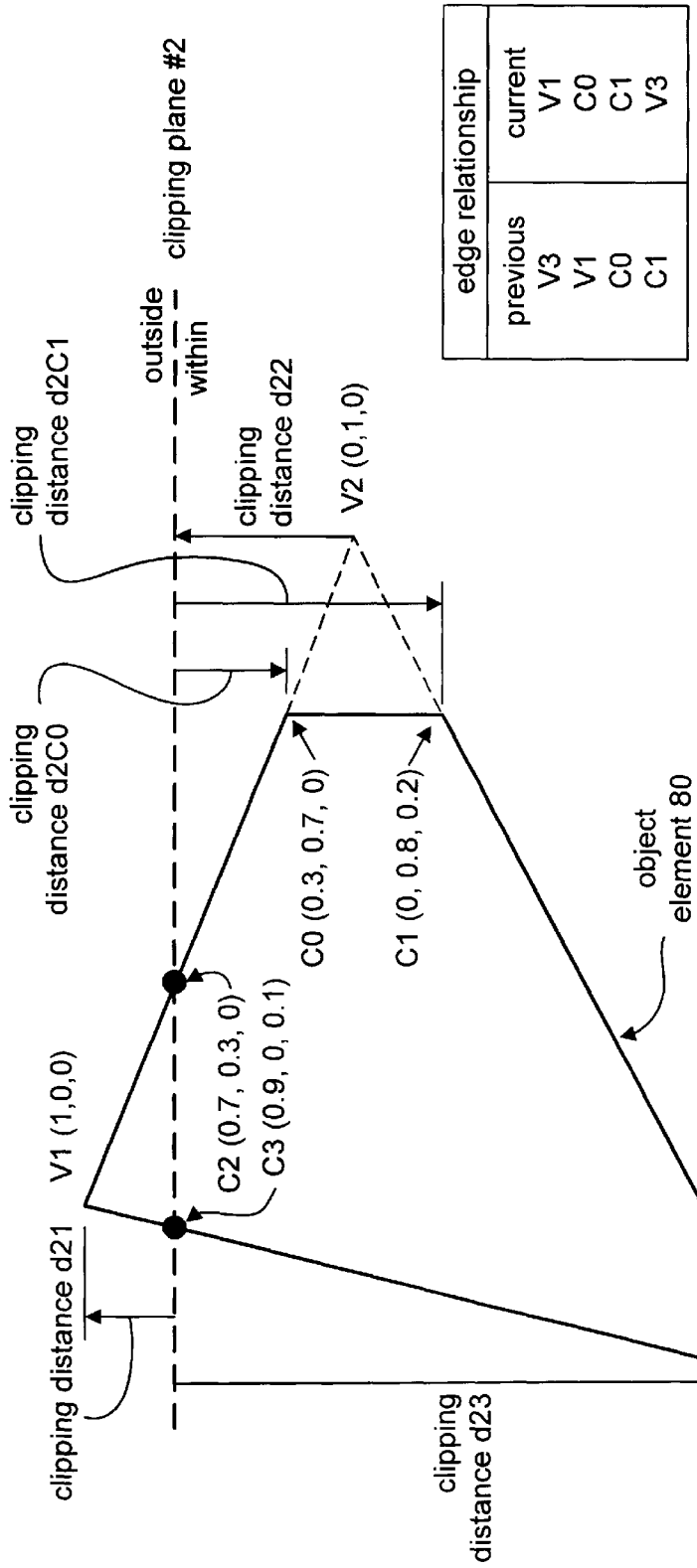

The processing of the first clipping plane only requires the derivation of the barycentric coordinates of the new vertices C0 and C1 and the corresponding clipped object-element vertices. Thus, once these values have been obtained, the clipping process continues to the next clipping plane without calculating the attributes for each vertex of the clipped object element. FIG. 5 illustrates the object-element 80 with respect to a second clipping plane. The clipping distances $d_{21}$, $d_{22}$ and $d_{23}$ are provided by the transform module and calculated in accordance with known techniques. The clipping distances $d_{2C0}$ and $d_{2C1}$ are derived based on the clipping distances $d_{21}$, $d_{22}$ and $d_{23}$ and the barycentric coordinates of C0 and C1, respectively. A detailed discussion of the derivation of the clipping distances for new vertices will be provided with respect to FIG. 10.

As shown, clipping plane 2 clips the object-element and produces new vertices C2 and C3. The barycentric coordinates for C2 and C3 are derived in accordance with the process as described with reference to FIG. 8. In addition, vertices of the newly clipped object-element 80 are shown in the clipped object-element for plane 2 table. The derivation of the new vertices is based on the edge relationship as shown in the corresponding table and the vertex determination chart.

Figure 6:
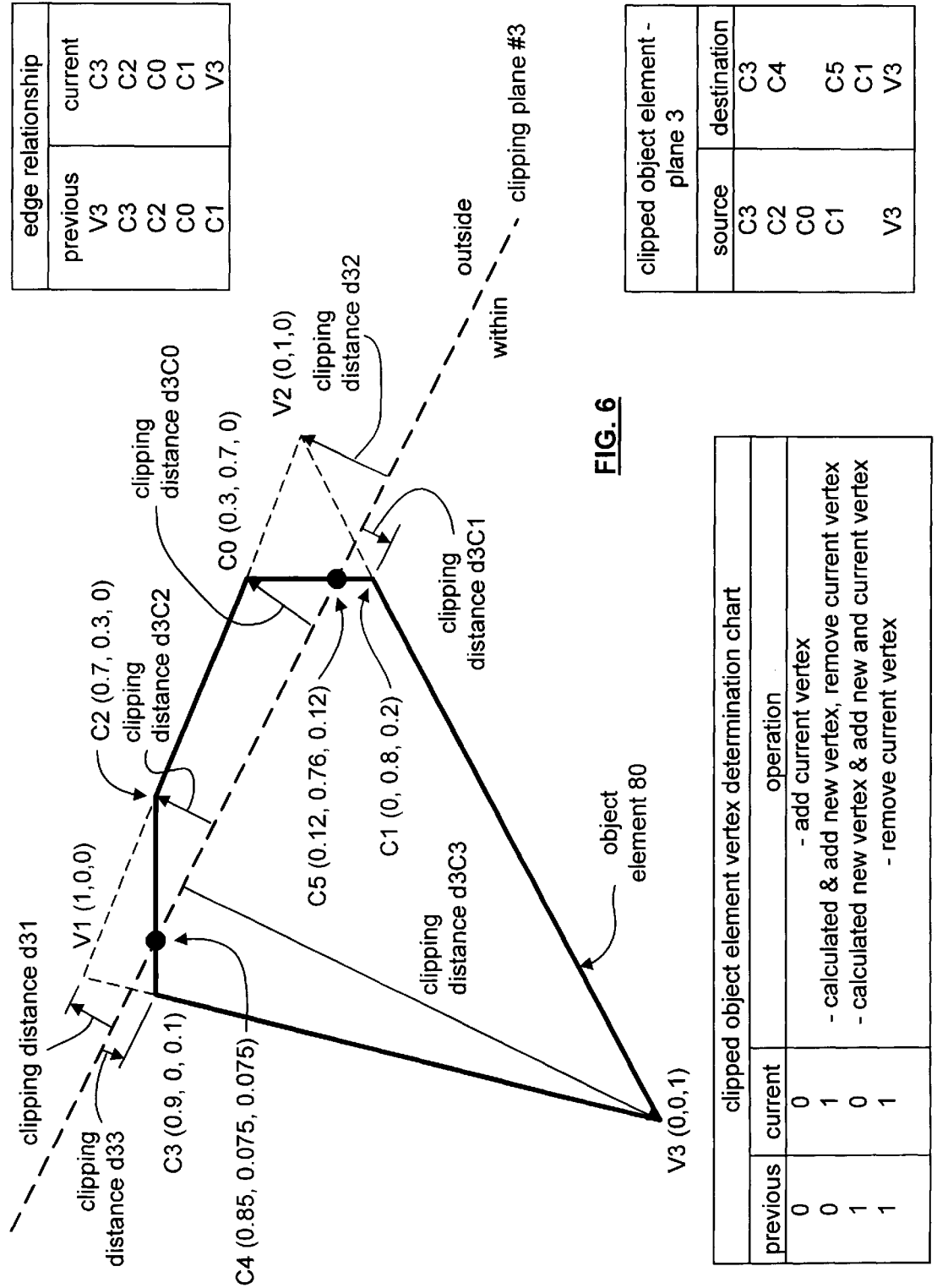

FIG. 6 illustrates the clipped object-element 80 being clipped by a third clipping plane. With respect to the third clipping plane, the clipping distances $d_{31}$, $d_{32}$ and $d_{33}$ are provided by the transformed module. The clipping distances for C0, C1, C2 and C3 are derived with respect to the third clipping plane as will be discussed with reference to FIG. 10. The barycentric coordinates for the new vertices C4 and C5 are calculated in accordance with the process of FIG. 8. From this information and the information contained in the edge relationship table, the vertices of the resulting clipped object-element with respect to plane 3 are identified. Having obtained the vertices (C3, C4, C5, C1 and V3) of the final clipped object-element with respect to planes 1, 2 and 3, the vertices are provided to the control module 52, which generates the geometric primitives 76.

Figure 7:
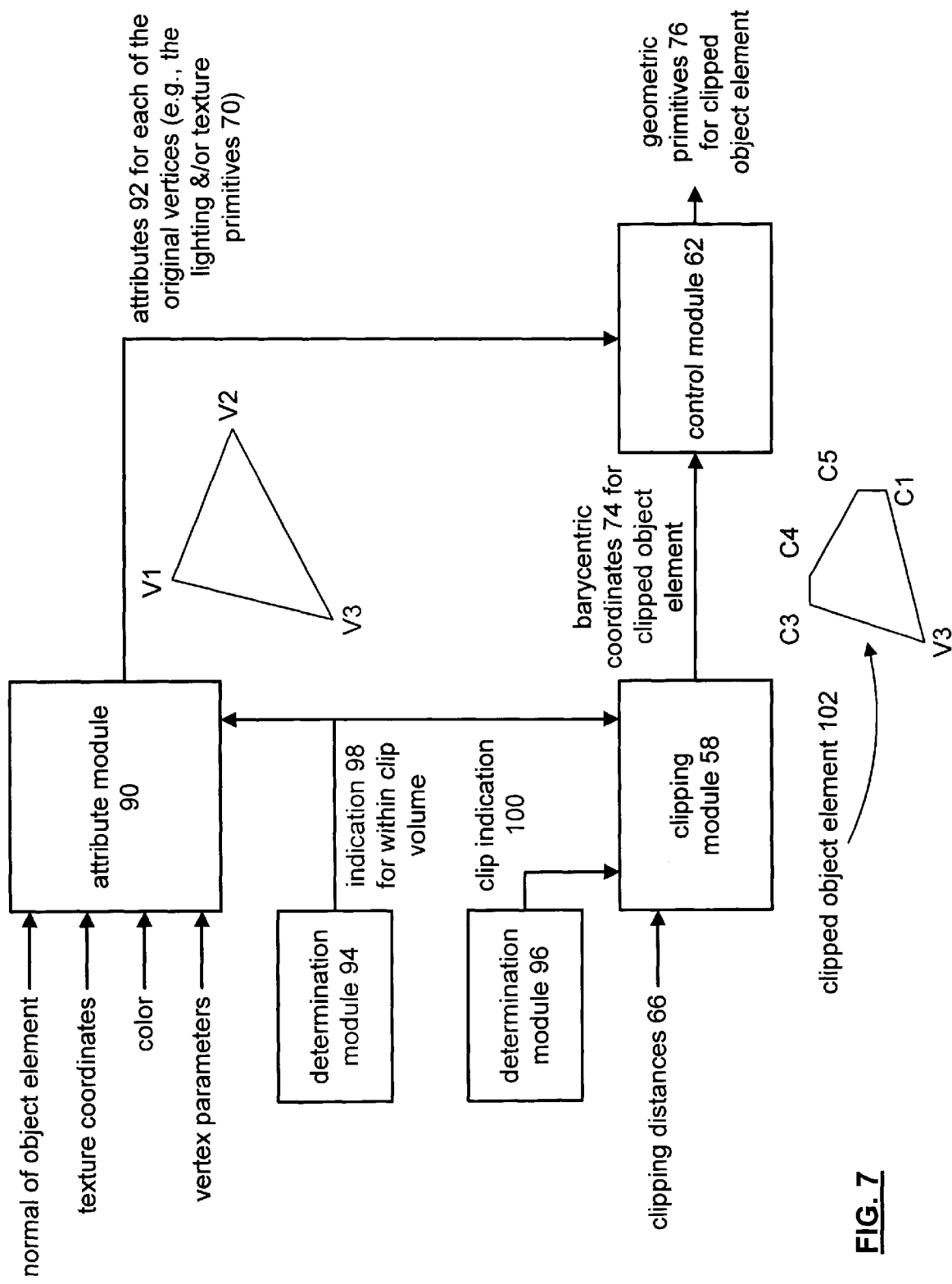
FIG. 7 illustrates a schematic block diagram of a geometric module in accordance with the present invention.

FIG. 7 illustrates the geometric module 54 in greater detail. As shown, the geometric module 54 includes an attribute module 90, the clipping module 58, the control module 62, a determination module 94, and a determination module 96. The determination module 94 is operably coupled to provide an indication 98 as to whether the object-element currently being processed is within the clipping volume. The determination module 94 may be implemented as a plurality of AND gates that are operably coupled to determine whether the object-element is completely outside the clipped volume with respect to at least one of the six planes of the display space or with respect to at least one of the user defined planes and further includes a plurality of OR gates operably coupled to the outputs of the plurality of AND gates to indicate that the object-element is not within the clipped volume when the object-element is completely outside of the clipped volume with respect to at least one of the six planes in display space or with respect to the at least one of the user defined planes.

The determination module 96 is operably coupled to provide a clip indication 100, which indicates that the current object-element is being clipped. The determination module 96 may be implemented as a plurality of OR gates that are operably coupled to determine, on a plane by plane basis, whether at least one edge of the object-element intersects with a plane of the display space or with a plane of the user defined planes. In addition, the determination module 96 may include a resulting OR gate operably coupled to the outputs of the plurality of OR gates to indicate that the clipping function is to be performed upon the object-element when at least one edge of the object-element intersects with at least one plane of the display space or the user defined planes.

The attribute module 90 may include a lighting function module and/or a texture function module. The attribute module 90 is operably coupled to receive a normal of the object-element, texture coordinates, color data, and the vertex parameters and/or spatial coordinates. The attribute module, when the indication 98 indicates that the current object-element is within the clipped volume, generates attributes 92 for each of the original vertices of the object-element. For example, the attributes 92 may include lighting primitives and/or texture primitives 70. Note that the attribute module 90 is computing the lighting parameters, which include the color information and/or the texture primitives in parallel with the processing by the clipping module 58.

The clipping module 58 is operably coupled to receive the clipped indication 100 and indication 98. In addition, the clipping module 58 receives the clipping distances 66 for each object-element with respect to each clipping plane. Based on these inputs, the clipping module 58 outputs barycentric coordinates for the clipped object-element. The clipped object-element 102, which is the resulting clipped object-element as described with reference to FIGS. 4 through 6, includes the barycentric coordinates 74 for each of the final vertices. The control module 62 receives the attributes 92 and the barycentric coordinates 74 to produce the geometric primitives 76 for the clipped object element. The control module is operably coupled to determine the clipped derived vertex parameters (i.e., the calculated geometric primitives 76) based on the barycentric coordinates and the attributes 92. The generation of the geometric primitives will be described in greater detail with reference to FIGS. 11 and 12.

Figure 8:
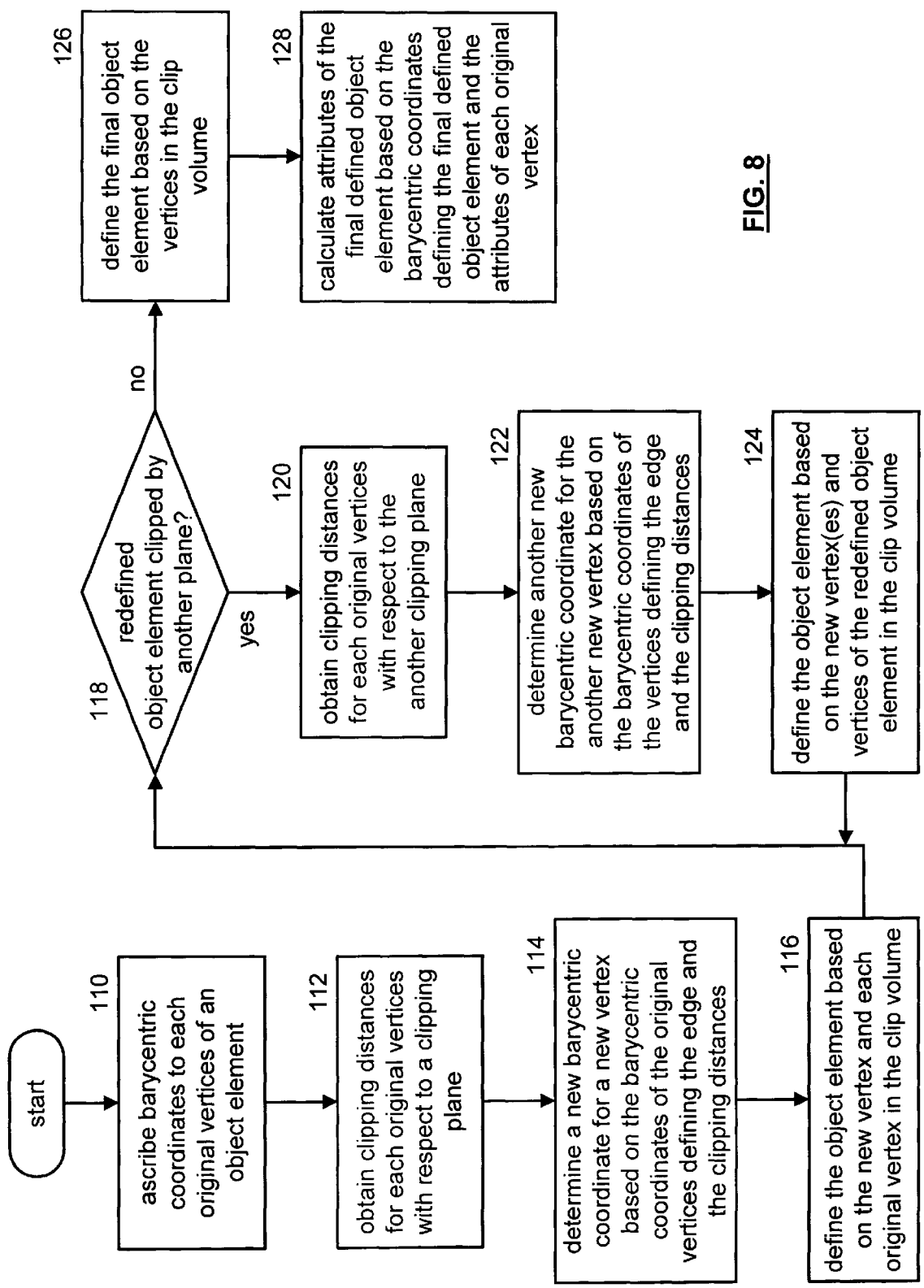
FIG. 8 illustrates a logic diagram of a method for clipping an object element in accordance with the present invention.

FIG. 8 illustrates a logic diagram of a method for clipping an object-element in accordance with a clipped volume. Note that the processing steps of FIG. 8 as well as the processing steps of FIGS. 9 through 12 may be implemented as operational instructions that are stored in memory and executed by a processing module. The process begins at step 110 where barycentric coordinates are ascribed to each original vertices of the object-element. The barycentric coordinates is a weighting factor with respect to a corresponding vertex and the other vertices. For example, the components of a barycentric coordinate includes an A component, a B component, and a C component, wherein each of the components is the weighting factor with respect to one of the original vertex. Continuing with the example, component A is associated with V1, component B is associated with V2, and component C is associated with V3. At V1, component A will be equal to one and components B and C will be zero. At V2, component B will be one and components A and C will be zero. At V3, component C will be one and components A and B will be zero. For points of the object element not at one of the original vertices, the A, B, and C components will sum to one and be determined based on the ratio with respect to the original vertices.

The process then proceeds to step 112 where clipping distances for each original vertices with respect to a clipping plane are obtained. This information is obtained from the transform module. The processing then proceeds to step 114 where a new barycentric coordinate is determined for a new vertex based on the barycentric coordinates of the original vertices defining the edge and the clipping distance. For example, the components of the new barycentric coordinate include an A, B, and C component. The clipping distances include $d_{11}$ for a first one of the original vertices defining the edge with respect to a first clipping plane and $d_{12}$ for a second one of the original vertices defining the edge with respect to the first clipping plane. The first one of the original vertices includes an A1, B1, and C1 components and the second one of the original vertices include an A2, B2 and C2 components of its respective barycentric coordinate. The A component of the barycentric coordinate for the new vertices may then be derived based on the equation $A1*[d_{12}/(d_{11}+d_{12})]+A2*[d_{11}/(d_{11}+d_{12})]$. The B component and C component of the barycentric coordinates for the new vertices are obtained in a similar fashion. Note that when a new vertex is created from clipping, clipping distances for that new vertex are only needed to be determined if the object element is to be clipped with respect to another plane, which will be discussed in greater detail with respect to FIG. 10.

The process then proceeds to step 116 where the object-element is defined based on the new vertices and each original vertices within the clipped volume. The process then proceeds to step 118 where a determination is made as to whether the redefined object-element is clipped by another plane. If so, the process proceeds to step 120 where clipping distances for each original vertices with respect to the new clipping plane are obtained. The process then proceeds to step 122 where another new barycentric coordinate for another new vertex is determined based on the barycentric coordinates of the vertices defining the edge and the clipping distances. Note that the vertices defining the edge intersecting the clipping plane may include one or more of the original vertices or one or more of newly defined vertices.

The process then proceeds to step 124 where the object-element is defined based on the new vertices and vertices of the redefined object-element within the clipped volume. Having done this, the process repeats at step 118. After each of the clipping volumes has been processed in accordance to steps 120 through 124, the process proceeds to step 126.

At step 126 the final object-element is defined based on the vertices within the clipped volume. The process then proceeds to step 128 where attributes of the finally defined object-element are calculated based on the barycentric coordinates of the vertices of the final object-element and the attributes of each original vertices. The attributes include spatial coordinates, color components, specular color components, fog components and/or texture components. For example, if the red color component is being derived, the equation that may be used to calculate the attribute for a vertices is red V1×A+red V2×B+red V3×C, wherein red V1, red V2, and red V3 correspond to the red color component at each of the original vertex of the object element.

Figure 9:
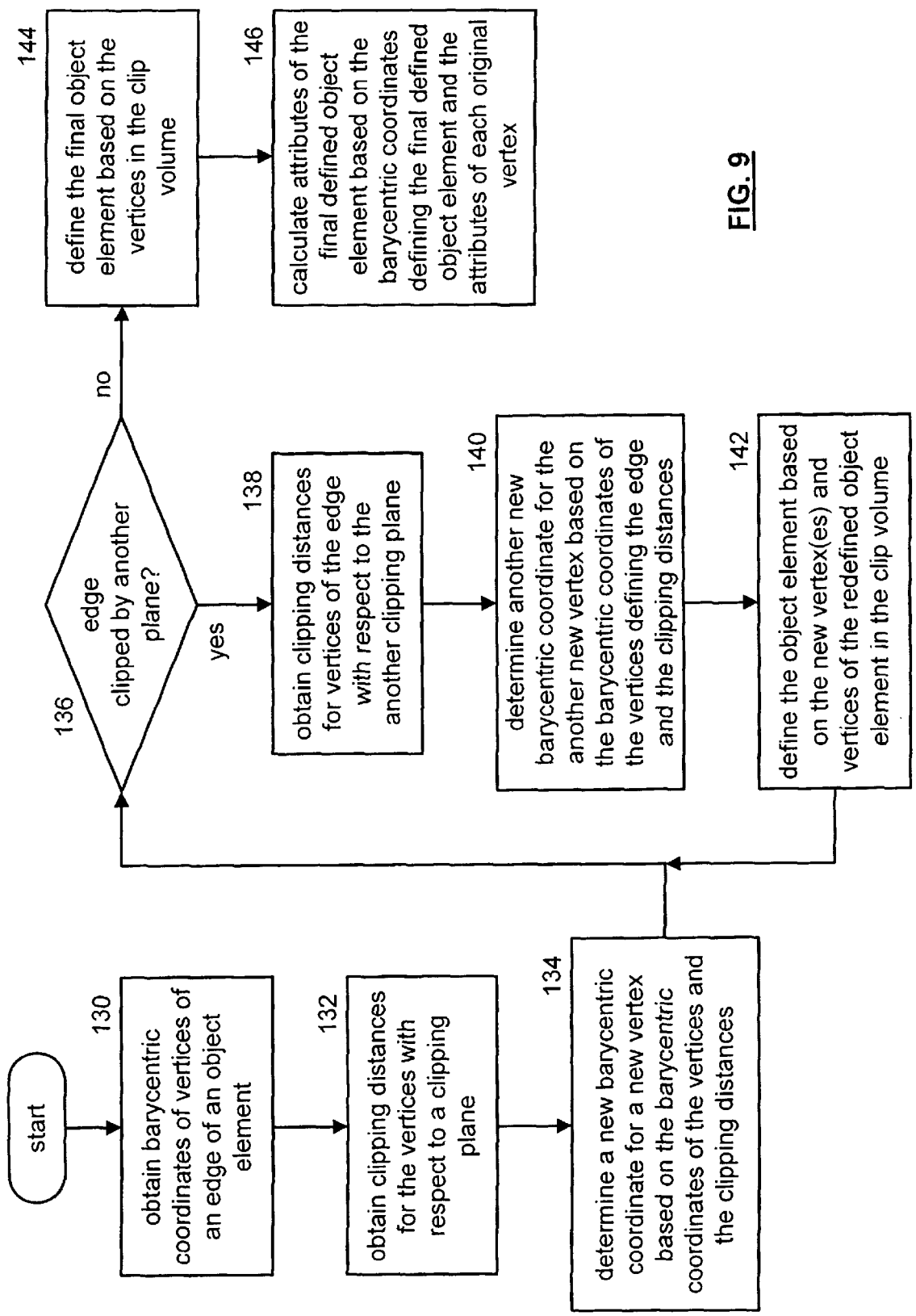
FIG. 9 illustrates a logic diagram of an alternate method for clipping an object-element in accordance with the present invention.

FIG. 9 illustrates a logic diagram of an alternate method for clipping an object-element in accordance with a clipped volume. The process begins at step 130 where barycentric coordinates of vertices of an edge of an object-element are obtained. The process then proceeds to step 132 where the clipping distances for the vertices with respect to a clipping plane are obtained. The process then proceeds to step 134 where a new barycentric coordinate for a new vertex is determined based on the barycentric coordinates of the vertices of the edge and the corresponding clipping distances.

The process then proceeds to step 136 where a determination is made as to whether another edge of the object-element is clipped by the plane or another plane. If so, the process proceeds to step 138 where clipping distances for the vertices of the edge with respect to the clipping plane are obtained. The process then proceeds to step 140 where another new barycentric coordinate is determined for another new vertex based on the barycentric coordinates of the vertices defining the edge and the corresponding clipping distances. The process then proceeds to step 142 where the object-elements are defined based on the new vertices and the original vertices of the redefined object-element in the clipped volume.

Once all of the new vertices have been determined the process proceeds to step 144. At step 144, the final object-element is defined based on the vertices in the clipped volume. The process then proceeds to step 146 where the attributes of the final object-element are calculated based on the barycentric coordinates defining the clipped final object-element and the attributes of each original vertices.

Figure 10:
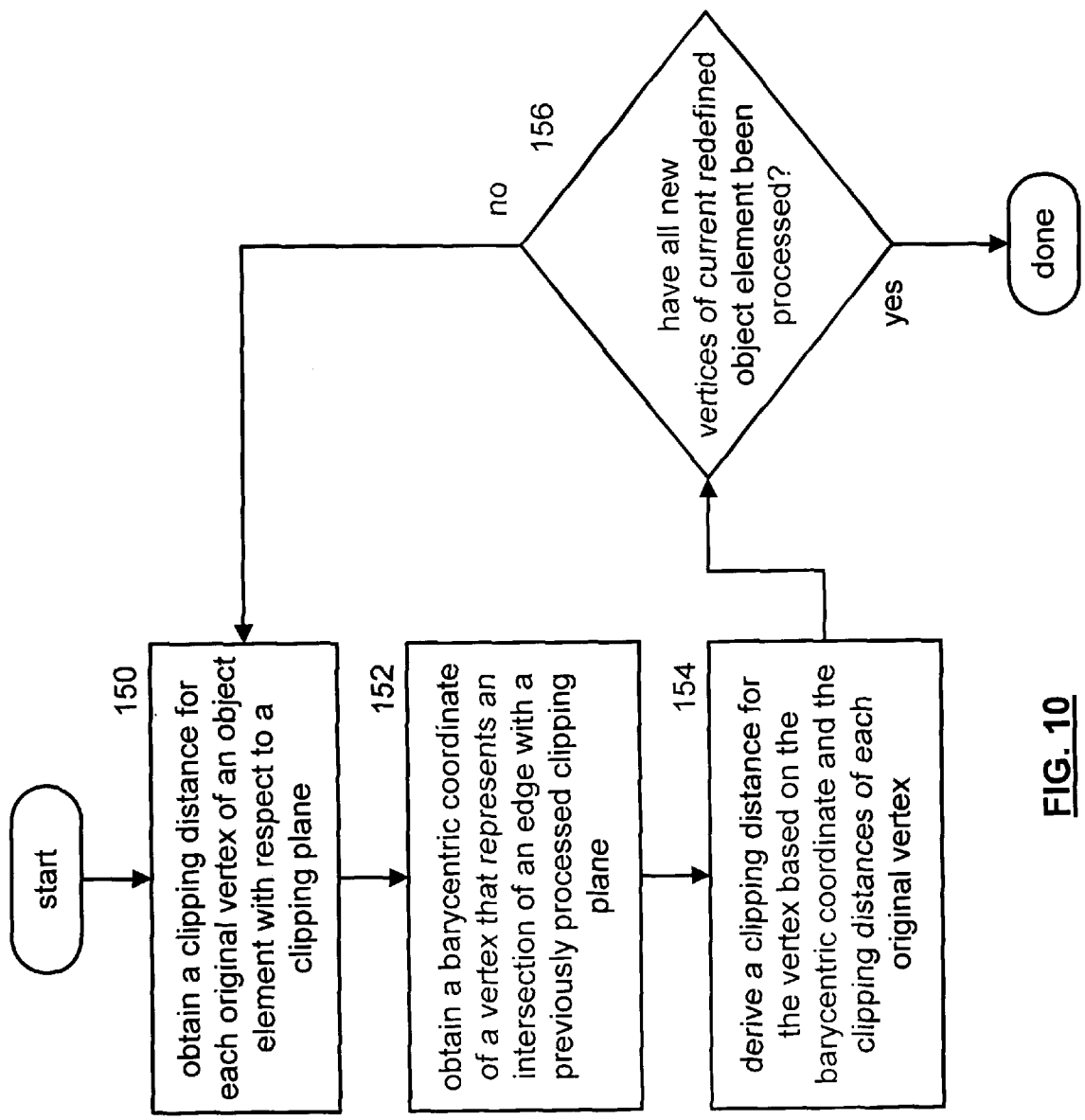
FIG. 10 illustrates a logic diagram of a method for determining clipping distances of new vertices in accordance with the present invention.

FIG. 10 illustrates a logic diagram of a method for determining clipping distances of vertices that were created by a previously processed clipping plane with respect to a current clipping plane. The process begins at step 150 where a clipping distance for each original vertex of an object-element with respect to a clipping plane is obtained. The generation of the clipping distance may be done within a transform step using a first set of equations when the clipping plane is one of six clipping planes of a clipped volume or a second set of equations when the clipping plane is one of a user-defined clipping planes. The first set of equations utilizes the view volume and differences thereof, where the second set of equations utilizes the user dot product and normal vector of the plane. Both sets of equations are known to be used in accordance with the Open GL specification.

The process then proceeds to step 152 where a barycentric coordinate of a vertex that represents an intersection of an edge with a previously processed clipping plane is obtained. For example, referring to FIG. 6, vertices C0 and C1 represent the vertices of previously processed clipping plane #1 and vertices C2 and C3 represent the vertices of previously processed clipping plane #2. For this example, the current clipping plane is clipping plane #3. Note that the generation of a barycentric coordinate was described with reference to FIGS. 8 and 9.

The process then proceeds to step 154 where a clipping distance for the vertex (e.g., C0) is derived based on the barycentric coordinate and the clipping distance of each original vertex with respect to the clipping plane. Accordingly, if V1, V2 and V3 represent the original vertices, where $d_{11}$, $d_{12}$ and $d_{13}$ represent the clipping distances for V1, V2 and V3 with respect to the current clipping plane, respectively, and C0 represents the new vertices, where AC0, BC0, and CC0, represent the barycentric coordinates of the vertex, the clipping distance of the current clipping plane with respect to C0 may be obtained by the equation $d_{11}*AC0+d_{12}*BC0+d_{13}*CC0$.

The process then proceeds to step 156 where a determination is made as to whether all new vertices of the current redefined object element have been processed. If a new vertex is identified, the process repeats at step 150. If a new vertex is not identified, the processing of determining clipping distances for new vertices with respect to the current clipping plane is complete. Continuing with the example of FIG. 6, once the clipping distance for C0 has been calculated with respect to clipping plane #3, a determination is made as to whether another new vertex is part of the clipped object element. In this example, C1 is still part of the clipped object element (i.e., the current redefined object element) and is processed in a similar manner as C0. The process would also identify, for this example, that C2 and C3 need to be processed as well.

Figure 11:
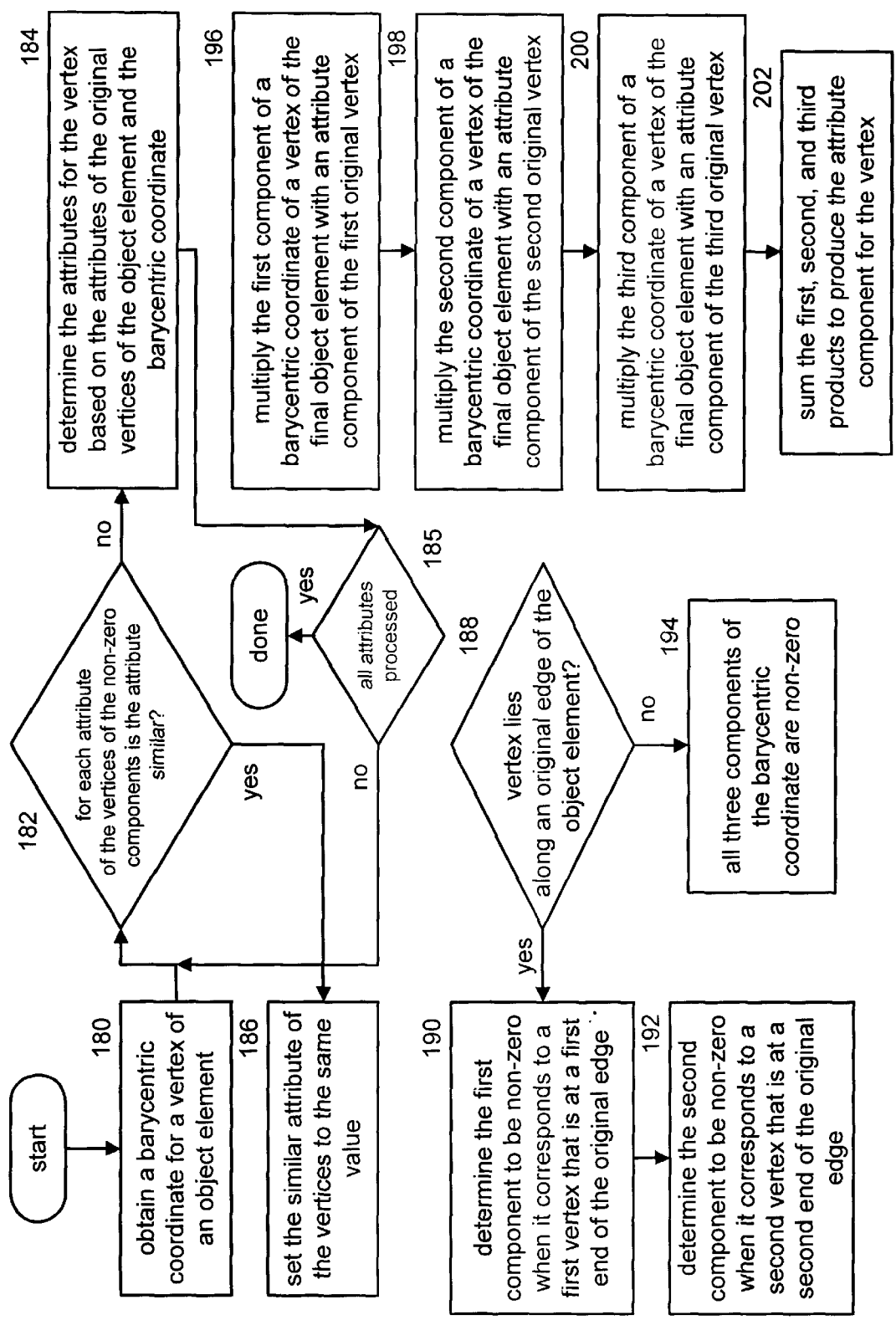
FIG. 11 illustrates a logic diagram of a method for determining object-element attributes in accordance with the present invention.

FIG. 11 illustrates a logic diagram of a method for determining object-element attributes using barycentric coordinates. The process begins at step 180 where a barycentric coordinate for a vertex of an object-element is obtained. The barycentric coordinate includes a first component that corresponds to a first original vertex of the object-element, a second component that corresponds to a second original vertex of the object-element, and a third component that corresponds to a third vertex of the object-element. Step 180 may be further processed by obtaining barycentric coordinates for vertices that define an edge of the object-element. Such processing would then continue by obtaining a clipping distance for the vertex, wherein the vertex lies at an intersection of a clipping plane and the edge. The processing would then continue by determining the barycentric coordinate of the vertex based on the clipping distance and the barycentric coordinates for the vertices that define the edge.

The process then proceeds to step 182 where a determination is made for each attribute of the vertices of the non-zero components have a similar attribute. The attributes include at least one of a red color component, a green color component, a blue color component, a red specular color component, a green specular color component, a blue specular color component, a S texture coordinate, a T texture coordinate, a Q texture coordinate, an X spatial coordinate, a Y spatial coordinate, a Z spatial coordinate and a W spatial coordinate. If the attributes are not similar (e.g., two vertices do not have the same red color component), the process proceeds to step 184 where the attributes for the vertex are determined based on the attributes of the original vertices of the object-element and the barycentric coordinate. The process then proceeds to step 185 where a determination is made as to whether all of the attributes have been processed. If so, the process is complete. If not, the process repeats at step 182. If, at step 182, an attribute of the non-zero components is similar, the process proceeds to step 186 where the similar attribute is set to be the same value. By setting the value of an attribute in this manner, video outputs avoids flicker, texture movement, and/or priority problems if the value was calculated. For example, if the red color component were calculated based on A*red0+B*red1+C*red2, where red0, red1, and red 2 all have the same value, the resultant of A+B+C=0.999 instead of 1. Accordingly, by setting the value based on similar values, the error in processing, and the corresponding video side affects, are avoided.

The processing of step 182 may be further described with reference to steps 188 through 194. At step 188 a determination is made as to whether the vertex lies along an original edge of the object-element. If not, the process proceeds to step 194 where all three components of the barycentric coordinate are non-zero. If, however, the vertex lies along an edge of the object-element, the process proceeds to step 190. At step 190, the first component is determined to be non-zero when it corresponds to a first vertex that is at a first end of the original edge. The process then proceeds to step 192 where the second component is determined to be non-zero when it corresponds to a second vertex that is at a second end of the original edge.

The processing of step 184 may be further described with reference to steps 196 through 202. At step 196, the first component of a barycentric coordinate of a vertex of the final object-element is multiplied with an attribute component of the first original vertex. The process then proceeds to step 198 where the second component of a barycentric coordinate of a vertex of the final object-element is multiplied with an attribute component of the second original vertex. The process then proceeds to step 200 where the third component of a barycentric coordinate of a vertex of the final object-element is multiplied with an attribute component of the third original vertex. The process then proceeds to step 202 where the first, second and third products are summed together to produce the attribute for the vertex component. For example, if the red color component is being utilized, the red color component for the vertex would equal red color component at V1 times the A component+red color component at V2 times the B component+red color component at V3 times the C component. Note that the A, B and C components comprise the barycentric coordinate of the vertex.

Figure 12:
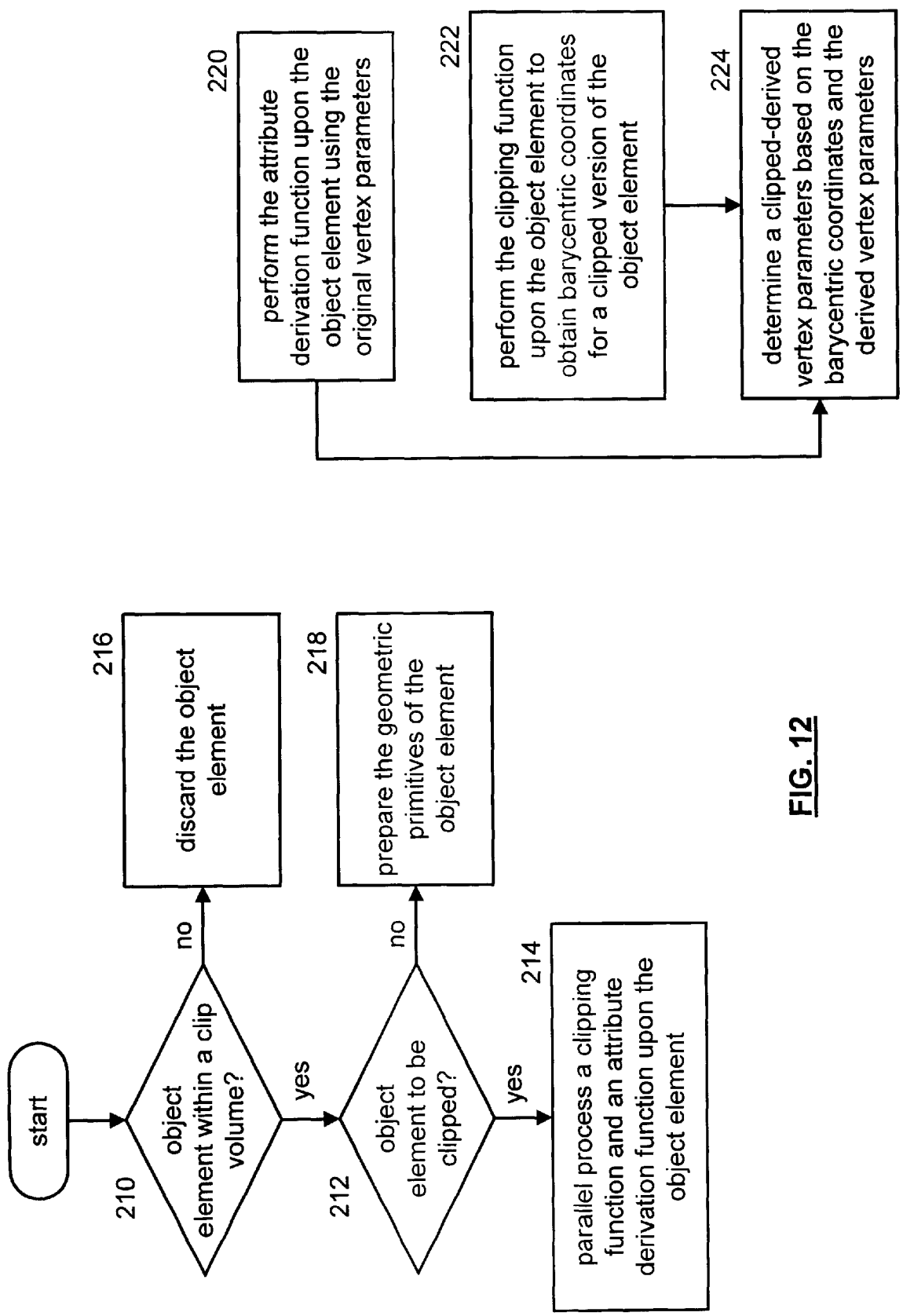
FIG. 12 illustrates a logic diagram of a method for parallel processing geometric aspects of video graphics data in accordance with the present invention.

FIG. 12 illustrates a logic diagram of a method for parallel processing of geometric aspects of a video graphics data. The process begins at step 210 where a determination is made as to whether the object-element is within a clipped volume. The clipped volume comprises six planes in display space and up to six user defined planes. Such a determination may be made by determining whether the object-element is completely outside the clipped volume with respect to at least one of the six planes in display space or with respect to at least one of the user defined planes. The processing would further include indicating that the object-element is not within the clipped volume when the object-element is completely outside the clipped volume with respect to at least one of the planes. If the object-element is not within the clipped volume, the process proceeds to step 216 where the object-element is discarded.

If, however, the object-element is within the clipped volume, the process proceeds to step 212. At step 212 a determination is made as to whether the object-element is to be clipped. Such a determination may be made by determining, on a plane by plane basis, whether at least one edge of the object-element intersects with a plane of the display space or the user defined space. When an edge intersects with a plane of the display space or user defined planes, an indication is provided that the clipping function is to be performed upon the object-element. If the object-element is not to be clipped, the process proceeds to step 218 where the geometric primitives are prepared for the object-elements using the original vertices. In this mode, only an attribute derivation function would be performed upon the object-elements. Such an attribute derivation function would be a lighting function and/or a texture function.

If, however, the object-element is to be clipped, the process proceeds to step 214. At step 214, a clipping function and an attribute derivation function (e.g., lighting and/or texture mapping) are processed in parallel upon the object-element. The parallel processing may be further described with respect to steps 220 through 224. At step 220 the attribute derivation function is performed upon the object-element using the original vertex parameters. At step 222 the clipping function is performed upon the object-element is performed to obtain barycentric coordinates for a clipped version of the object-element. The process then proceeds to step 224 from steps 220 and 222 where a clipped derived vertex parameters are determined based on the barycentric coordinates and the derived vertex parameters.

The preceding discussion has presented a method and apparatus for producing an efficient and implementable hardware version of a geometric engine. By utilizing barycentric coordinates, an object-element can be processed with respect to 12 clipping planes with a substantially reduced memory requirement and reduced processing requirements. As one of average skill in the art will appreciate, other embodiments may be derived from the teachings of the present invention without deviating from the scope of the claims.

What is claimed is:

1. A method for clipping an object element in accordance with a clip volume, the method comprises the steps of:

a) ascribing barycentric coordinates to each original vertices of an object element, wherein each barycentric coordinate is a weighting factor with respect to a corresponding vertex;

b) obtaining clipping distances for each original vertices with respect to a clipping plane;

for a new vertex of the object element that represents an intersection of an edge of the object element with the clipping plane:

c) determining a new barycentric coordinate for the new vertex based on the barycentric coordinates of the original vertices defining the edge and the clipping distances.

2. The method of claim 1 further comprises defining the object element based on the new vertex and each original vertices within the clip volume with respect to the clipping plane to produce a newly defined object element.

3. The method of claim 2, wherein the clipping plane is one of six clipping planes of the clip volume or one of six user defined clipping planes, the method further comprises:

determining whether another clipping plane of the six clipping planes or of the six user defined clipping planes intersects an edge of the newly defined object element;

obtaining new clipping distances for each vertices of the newly defined object element with respect to the another clipping plane;

when the another plane of six clipping planes or the six user defined clipping planes intersects the edge the newly defined object element, determining another new barycentric coordinate for another new vertex based on the barycentric coordinates of the original vertices defining the edge and the new clipping distances, wherein the another new vertex of the object element that represents an intersection of the edge of the newly defined object element with the another clipping plane; and defining the newly defined object element based on the another new vertex, the new vertex, and each original vertices within the clip volume with respect to the clipping plane and the another clipping plane to produce another newly defined object element.

4. The method of claim 3 further comprises repeating the determining whether another clipping plane intersects an edge of the another newly defined object element step, the obtaining new clipping distances step, the determining another new barycentric coordinate step, and the defining step until a final defined object element is obtained.

5. The method of claim 4 further comprises calculating attributes of the final defined object element based on the barycentric coordinates defining the final defined object element and the attributes of each of the original vertices.

6. The method of claim 5, wherein the attributes comprise at least one of: vertex coordinates (x,y,z,w), color components, specular color components, fog components, and texture coordinates.

7. The method of claim 5 further comprises providing the attributes of the final defined object element to a barycentric controller without storing the attributes of the final defined object element.

8. The method of claim 1, wherein step (c) further comprises determining each component of the new barycentric coordinate, wherein the components of the new barycentric coordinates includes an A, B, and C component, wherein the clipping distances includes D1 for a first one of the original vertices defining the edge and D2 for a second one of the original vertices defining the edge, wherein the first one of the original vertices includes an A1, B1, and C1 component and the second one of the original vertices includes an A2, B2, and C2 component, and wherein the determining for the A component equals $A1*[D2/(D1+D2)]+A2*[D1/(D1+D2)]$.

9. A method for clipping an object element in accordance with a clip volume, the method comprises the steps of:

a) obtaining barycentric coordinates of vertices of an edge of an object element, wherein each barycentric coordinate is a weighting factor with respect to a corresponding vertex and wherein the edge intersects with a clipping plane;

b) obtaining clipping distances for the vertices with respect to the clipping plane;

for a new vertex of the object element that represents an intersection of the edge with the clipping plane:

c) determining a new barycentric coordinate for the new vertex based on the barycentric coordinates of the vertices and the clipping distances for the vertices.

10. The method of claim 9 further comprises defining the object element based on the new vertex and each original vertices within the clip volume with respect to the clipping plane to produce a newly defined object element.

11. The method of claim 10, wherein the clipping plane is one of six clipping planes of the clip volume or one of six user defined clipping planes, wherein the method further comprises:

determining whether another clipping plane of the six clipping planes or of the six user defined clipping planes intersects an edge of the newly defined object element;

obtaining new clipping distances for each vertices of the newly defined object element with respect to the another clipping plane;

when the another plane of six clipping planes or the six user defined clipping planes intersects the edge the newly defined object element, determining another new barycentric coordinate for another new vertex based on the barycentric coordinates of the original vertices defining the edge and the new clipping distances, wherein the another new vertex of the object element that represents an intersection of the edge of the newly defined object element with the another clipping plane; and defining the newly defined object element based on the another new vertex, the new vertex, and each original vertices within the clip volume with respect to the clipping plane and the another clipping plane to produce another newly defined object element.

12. The method of claim 11 further comprises repeating the determining whether another clipping plane intersects an edge of the another newly defined object element step, the obtaining new clipping distances step, the determining another new barycentric coordinate step, and the defining step until a final defined object element is obtained.

13. The method of claim 12 further comprises calculating attributes of the final defined object element based on the barycentric coordinates defining the final defined object element and the attributes of each of the original vertices.

14. The method of claim 12 further comprises providing the attributes of the final defined object element to a barycentric controller without storing the attributes of the final defined object element.

15. The method of claim 9, wherein step (c) further comprises determining each component of the new barycentric coordinate, wherein the components of the new barycentric coordinates includes an A, B, and C component, wherein the clipping distances includes D1 for a first one of the original vertices defining the edge and D2 for a second one of the original vertices defining the edge, wherein the first one of the original vertices includes an A1, B1, and C1 component and the second one of the original vertices includes an A2, B2, and C2 component, and wherein the determining for the A component equals A1*[D2/(D1+D2)]+A2*[D1/(D1+D2)].

16. An apparatus for clipping an object element in accordance with a clip volume, the apparatus comprises:
  a processing module; and
  memory operably coupled to the processing module, wherein the memory stores operational instructions that cause the processing module to: ascribe barycentric coordinates to each original vertices of an object element, wherein each barycentric coordinate is a weighting factor with respect to a corresponding vertex; obtain clipping distances for each original vertices with respect to a clipping plane; and for a new vertex of the object element that represents an intersection of an edge of the object element with the clipping plane, determine a new barycentric coordinate for the new vertex based on the barycentric coordinates of the original vertices defining the edge and the clipping distances.

17. The apparatus of claim 16, wherein the memory further comprises operational instructions that cause the processing module to define the object element based on the new vertex and each original vertices within the clip volume with respect to the clipping plane to produce a newly defined object element.

18. The apparatus of claim 17, wherein the memory further comprises operational instructions that cause the processing module to, wherein the clipping plane is one of six clipping planes of the clip volume or one of six user defined clipping planes:
  determine whether another clipping plane of the six clipping planes or of the six user defined clipping planes intersects an edge of the newly defined object element;
  obtain new clipping distances for each vertices of the newly defined object element with respect to the another clipping plane;
  when the another plane of six clipping planes or the six user defined clipping planes intersects the edge the newly defined object element, determine another new barycentric coordinate for another new vertex based on the barycentric coordinates of the original vertices defining the edge and the new clipping distances, wherein the another new vertex of the object element that represents an intersection of the edge of the newly defined object element with the another clipping plane; and
  define the newly defined object element based on the another new vertex, the new vertex, and each original vertices within the clip volume with respect to the clipping plane and the another clipping plane to produce another newly defined object element.

19. The apparatus of claim 18, wherein the memory further comprises operational instructions that cause the processing module to repeat the determining whether another clipping plane intersects an edge of the another newly defined object element step, the obtaining new clipping distances step, the determining another new barycentric coordinate step, and the defining step until a final defined object element is obtained.

20. The apparatus of claim 19, wherein the memory further comprises operational instructions that cause the processing module to calculate attributes of the final defined object element based on the barycentric coordinates defining the final defined object element and the attributes of each of the original vertices.

21. The apparatus of claim 16, wherein the memory further comprises operational instructions that cause the processing module to determine a new barycentric coordinate for the new vertex by:
  determining each component of the new barycentric coordinate , wherein the components of the new barycentric coordinates includes an A, B, and C component, wherein the clipping distances includes D1 for a first one of the original vertices defining the edge and D2 for a second one of the original vertices defining the edge, wherein the first one of the original vertices includes an A1, B1, and C1 component and the second one of the original vertices includes an A2, B2, and C2 component, and wherein the determining for the A component equals A1*[D2/(D1+D2)]+A2*[D1/(D1+D2)].

22. An apparatus for clipping an object element in accordance with a clip volume, the apparatus comprises:
  a processing module; and
  memory operably coupled to the processing module, wherein the memory stores operational instructions that cause the processing module to: obtain barycentric coordinates of vertices of an edge of an object element, wherein each barycentric coordinate is a weighting factor with respect to a corresponding vertex and wherein the edge intersects with a clipping plane; obtain clipping distances for the vertices with respect to the clipping plane; and for a new vertex of the object element that represents an intersection of the edge with the clipping plane, determine a new barycentric coordinate for the new vertex based on the barycentric coordinates of the vertices and the clipping distances for the vertices.

23. The apparatus of claim 22, wherein the memory further comprises operational instructions that cause the processing module to define the object element based on the new vertex and each original vertices within the clip volume with respect to the clipping plane to produce a newly defined object element.

24. The apparatus of claim 23, wherein the memory further comprises operational instructions that cause the processing module to, wherein the clipping plane is one of six clipping planes of the clip volume or one of six user defined clipping planes:
  determine whether another clipping plane of the six clipping planes or of the six user defined clipping planes intersects an edge of the newly defined object element;
  obtain new clipping distances for each vertices of the newly defined object element with respect to the another clipping plane;
  when the another plane of six clipping planes or the six user defined clipping planes intersects the edge the newly defined object element, determine another new barycentric coordinate for another new vertex based on the barycentric coordinates of the original vertices defining the edge and the new clipping distances, wherein the another new vertex of the object element that represents an intersection of the edge of the newly defined object element with the another clipping plane; and define the newly defined object element based on the another new vertex, the new vertex, and each original vertices within the clip volume with respect to the clipping plane and the another clipping plane to produce another newly defined object element.

25. The apparatus of claim 24, wherein the memory further comprises operational instructions that cause the processing module to repeat the determining whether another clipping plane intersects an edge of the another newly defined object element step, the obtaining new clipping distances step, the determining another new barycentric coordinate step, and the defining step until a final defined object element is obtained.

26. The apparatus of claim 25, wherein the memory further comprises operational instructions that cause the processing module to calculate attributes of the final defined object element based on the barycentric coordinates defining the final defined object element and the attributes of each of the original vertices.

27. The apparatus of claim 26, wherein the memory further comprises operational instructions that cause the processing module to provide the attributes of the final defined object element to a barycentric controller without storing the attributes of the final defined object element.

28. The apparatus of claim 22, wherein the memory further comprises operational instructions that cause the processing module to determine a new barycentric coordinate for the new vertex by:

determining each component of the new barycentric coordinate, wherein the components of the new barycentric coordinates includes an A, B, and C component, wherein the clipping distances includes D1 for a first one of the original vertices defining the edge and D2 for a second one of the original vertices defining the edge, wherein the first one of the original vertices includes an A1, B1, and C1 component and the second one of the original vertices includes an A2, B2, and C2 component, and wherein the determining for the A component equals $A1*[D2/(D1+D2)]+A2*[D1/(D1+D2)]$.

* * * * *